United States Patent
Zhou et al.

(10) Patent No.: US 10,686,211 B2
(45) Date of Patent: Jun. 16, 2020

(54) PRESSING DEVICE

(71) Applicant: NINGDE AMPEREX TECHNOLOGY LIMITED, Ningde (CN)

(72) Inventors: Ligang Zhou, Ningde (CN); Yulong Dong, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 499 days.

(21) Appl. No.: 15/457,770

(22) Filed: Mar. 13, 2017

(65) Prior Publication Data

US 2017/0271710 A1    Sep. 21, 2017

(30) Foreign Application Priority Data

Mar. 18, 2016   (CN) ..................... 2016 2 0211570 U

(51) Int. Cl.
| | | |
|---|---|---|
| *B30B 15/06* | (2006.01) | |
| *H01M 10/04* | (2006.01) | |
| *H01M 6/00* | (2006.01) | |

(52) U.S. Cl.
CPC ....... *H01M 10/0468* (2013.01); *B30B 15/062* (2013.01); *B30B 15/065* (2013.01); *B30B 15/068* (2013.01); *H01M 6/005* (2013.01); *H01M 10/0481* (2013.01)

(58) Field of Classification Search
CPC ... B30B 15/062; B30B 15/065; B30B 15/068; H01M 6/005; H01M 10/0468; H01M 10/0481

USPC .................................................. 100/193, 265
See application file for complete search history.

(56) References Cited

U.S. PATENT DOCUMENTS

| | | | | |
|---|---|---|---|---|
| 534,702 A | * | 2/1895 | Stecker ................... | B30B 9/321 100/131 |
| 2,887,946 A | * | 5/1959 | Barnes .................... | G01N 1/286 100/265 |
| 2,925,619 A | * | 2/1960 | Sindelar .................. | B22F 3/172 425/78 |
| 4,045,152 A | * | 8/1977 | Peterson ................. | A01J 25/12 425/419 |
| 4,330,252 A | * | 5/1982 | Bullock ................ | B65B 63/022 100/265 |

(Continued)

FOREIGN PATENT DOCUMENTS

| | | |
|---|---|---|
| CN | 100397758 C | 6/2008 |
| CN | 203056032 U | 7/2013 |

*Primary Examiner* — Jimmy T Nguyen
(74) *Attorney, Agent, or Firm* — Morgan, Lewis & Bockius LLP

(57) ABSTRACT

The present disclosure provides a pressing device which includes: at least two floating heads which are arranged side by side; a positioning member connecting with each floating head and defining a position of each floating head; a cover plate positioned above each floating head; and elastic members, each elastic member being provided between the cover plate and the corresponding floating head so as to make the cover plate slide up and down relative to each floating head. The pressing device can be adapted to a step type cell or a step type battery having a certain tolerance in thickness and can ensure that every step surface of the step type cell or the step type battery is uniformly pressed, thereby improving the quality of the battery.

6 Claims, 5 Drawing Sheets

(56) References Cited

U.S. PATENT DOCUMENTS

| | | | |
|---|---|---|---|
| 9,016,342 B2* | 4/2015 | Kobayashi | H01L 24/75 100/264 |
| 9,680,138 B2* | 6/2017 | Ejima | H01M 2/206 |
| 2002/0109267 A1* | 8/2002 | Herbst | B29C 43/36 264/328.7 |
| 2010/0151306 A1* | 6/2010 | Fredriksson | H01M 2/10 429/99 |
| 2015/0125164 A1* | 5/2015 | Li | G02B 7/1825 398/201 |

* cited by examiner

PRESSING DEVICE

REFERRING TO RELATED APPLICATIONS

The present application claims priority to Chinese patent application No. 201620211570.X, filed on Mar. 18, 2016, which is incorporated herein by reference in its entirety.

FIELD OF THE PRESENT DISCLOSURE

The present disclosure relates to a field of battery, and specifically relates to a pressing device.

BACKGROUND OF THE PRESENT DISCLOSURE

In preparation of a battery, in order to make electrode plates better attached together to improve performance and quality of the battery, it needs to hot press a cell of the battery. Generally, for a conventional non-step type cell, it often uses a flat-plate type pressing device to hot press; but for a new step type cell, it is common to add an outer vest fixed outside the step type cell and then perform pressing, because a height of each step of the outer vest is constant, when there is a tolerance in a thickness of each step of the step type cell, it cannot ensure uniform pressure, thereby affecting the quality of the step type cell.

SUMMARY OF THE PRESENT DISCLOSURE

In view of the problem existing in the background of the present disclosure, an object of the present disclosure is to provide a pressing device, which can be adapted to a step type cell with a certain tolerance in thickness, and ensure that every step surface of the step cell is uniformly pressed, thereby improving the quality of a battery.

In order to achieve the above object, the present disclosure provides a pressing device, which comprises: at least two floating heads which are arranged side by side; a positioning member connecting with each floating head and defining a position of each floating head; a cover plate positioned above each floating head; and elastic members, each elastic member being provided between the cover plate and the corresponding floating head so as to make the cover plate slide up and down relative to each floating head.

The present disclosure has the following beneficial effects: in the pressing device according to the present disclosure, the positioning member defines the position of each floating head so as to prevent the floating heads which are arranged side by side from swaying and loosening. When the pressing device works, each floating head is disposed on a corresponding step surface of a workpiece, then the cover plate is pressed down, due to the elastic member provided between the cover plate and each floating head, the cover plate can slide up and down relative to the floating head to realize that each floating head presses down the workpiece. The structure of the pressing device is simple and easy to operate, it can be adapted to a step type cell or a step type battery having a certain tolerance in thickness and can ensure that every step surface of the step type cell or the step type battery is uniformly pressed, thereby improving the quality of the battery.

Figure 1:
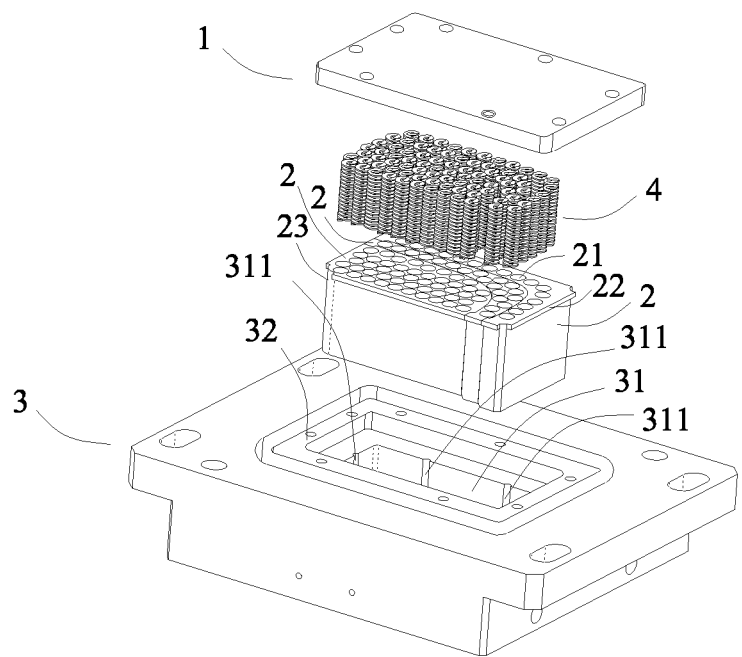
FIG. 1 is an exploded perspective view of an embodiment of a pressing device according to the present disclosure.

Reference numerals are represented as follows:
1 cover plate
11 counterbore
12 receiving hole
2 floating head
21 mounting hole
22 flange
23 protruding post
3 positioning member
31 receiving recess
  311 groove
32 boss
33 head portion
34 tail portion
4 elastic member
B workpiece
B1 step surface
A bottom plate

DETAILED DESCRIPTION

A pressing device according to the present disclosure will be described in detail with referring to the figures.

Referring to FIG. 1 to FIG. 10, a pressing device according to the present disclosure comprises: at least two floating heads 2 which are arranged side by side; a positioning member 3 connecting with each floating head 2 and defining a position of each floating head 2; a cover plate 1 positioned above each floating head 2; and elastic members 4, each elastic member 4 is provided between the cover plate 1 and the corresponding floating head 2, so as to make the cover plate 1 slide up and down relative to each floating head 2.

In the pressing device according to the present disclosure, the positioning member 3 defines the position of each floating head 2 so as to prevent the floating heads 2 which are arranged side by side from swaying and loosening. When the pressing device works, each floating head 2 is disposed on a corresponding step surface B1 of a workpiece B, then the cover plate 1 is pressed down, due to the elastic member 4 provided between the cover plate 1 and each floating head 2, the cover plate 1 can slide up and down relative to the floating head 2 to realize that each floating head 2 presses down the workpiece B. The structure of the pressing device is simple and easy to operate, it can be adapted to a step type cell or a step type battery having a certain tolerance in thickness and can ensure that every step surface of the step type cell or the step type battery is uniformly pressed, thereby improving the quality of the battery.

The pressing device according to the present disclosure, in an embodiment, referring to FIG. 1 to FIG. 6, a height position of a lower surface of each floating head 2 is different. Here it is noted that, the height position of the lower surface of each floating head 2 is mainly determined by a height of the corresponding step surface B1 of the workpiece B as described below.

In an embodiment, referring to FIG. 1 to FIG. 3, FIG. 5 and FIG. 6, each elastic member 4 may be a spring. But the present disclosure is not limited to this, each elastic member 4 also may be an elastomer. Furthermore, referring to FIG. 4, the elastomer may be made of rubber or silica gel.

Figure 6:
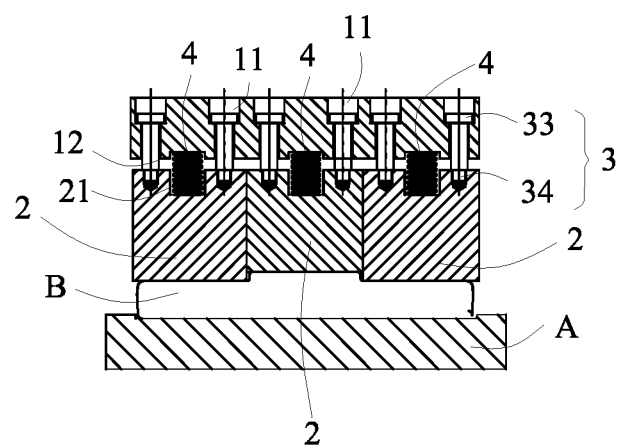
FIG. 6 is a partial cross sectional view of each component of FIG. 5 after assembled with a bottom plate shown.
Figure 7:
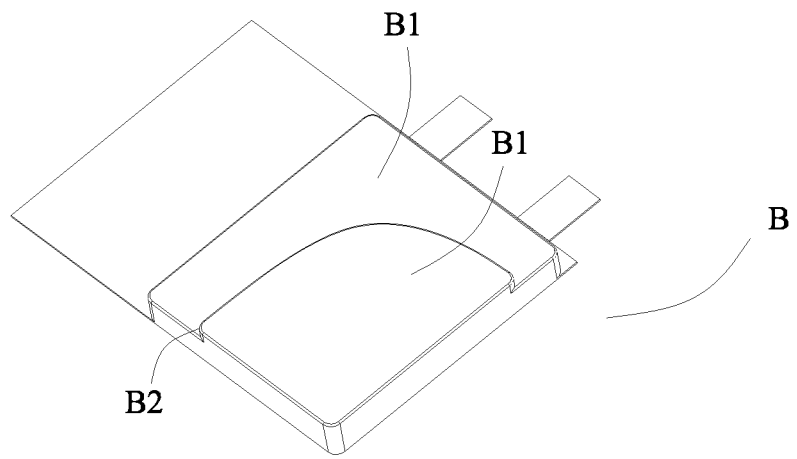
FIG. 7 is a perspective view of a workpiece on which the pressing device according to the present disclosure acts in an embodiment.
Figure 8:
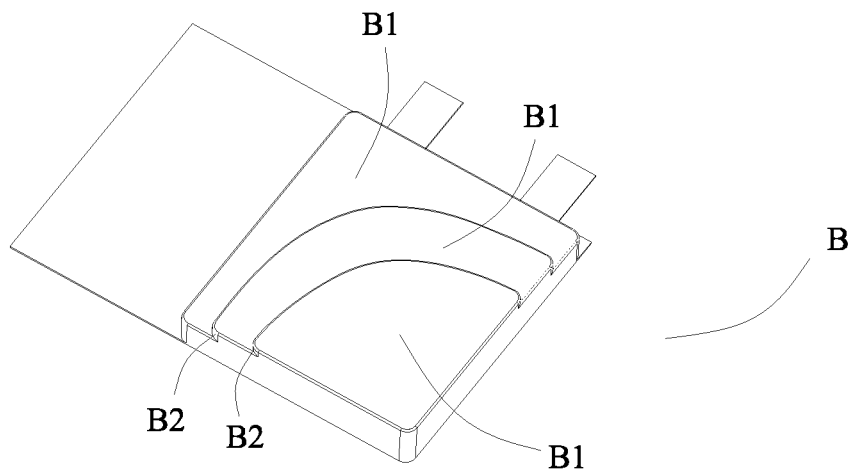
FIG. 8 is a variant of FIG. 7.
Figure 9:
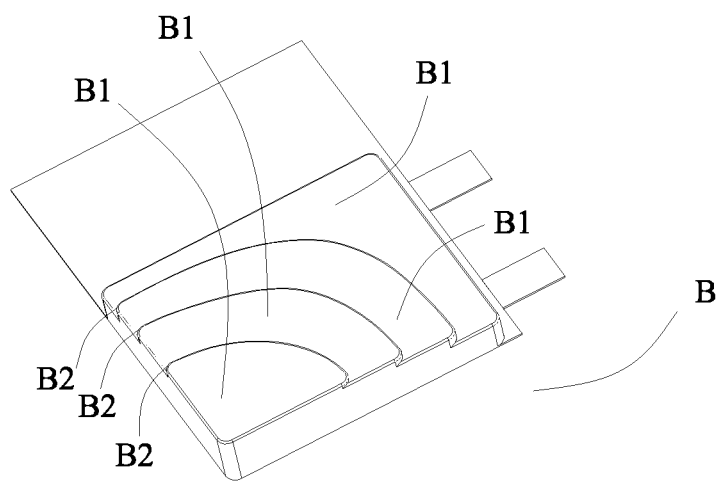
FIG. 9 is another variant of FIG. 7.
Figure 10:
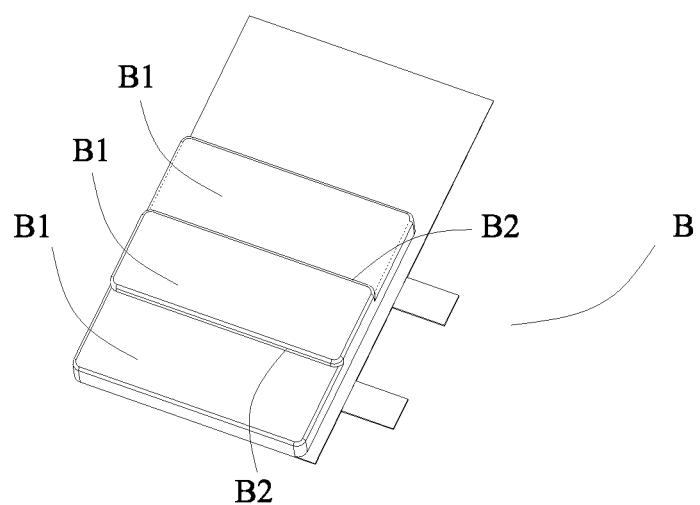
FIG. 10 is still variant of FIG. 7.

In an embodiment, referring to FIG. 6, the cover plate 1 may be provided with receiving holes 12, one end of each spring is received in the corresponding receiving hole 12 and the other end of each spring abuts an upper surface of the corresponding floating head 2.

Figure 2:
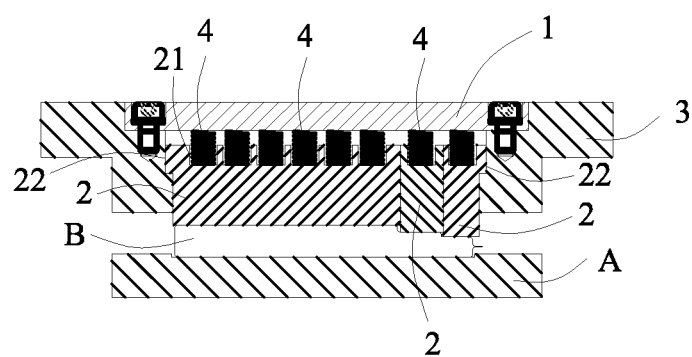
FIG. 2 is a partial cross sectional view of components of FIG. 1 after assembled.
Figure 3:
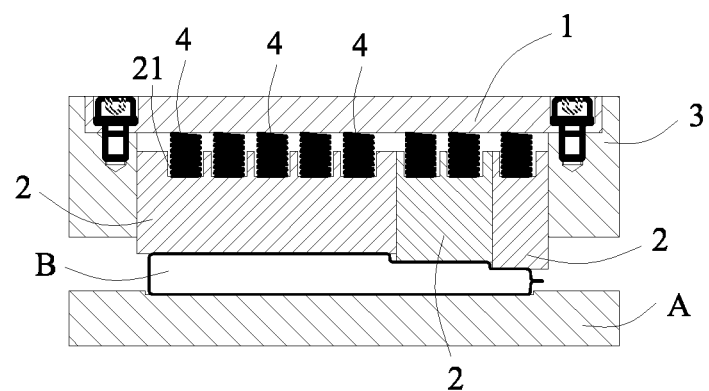
FIG. 3 is a variant of FIG. 2.

In an embodiment, referring to FIG. 1 to FIG. 3, each floating head 2 may be provided with a mounting hole 21, one end of each spring is received in the corresponding mounting hole 21 and the other end of each spring abuts a lower surface of the cover plate 1.

Figure 4:
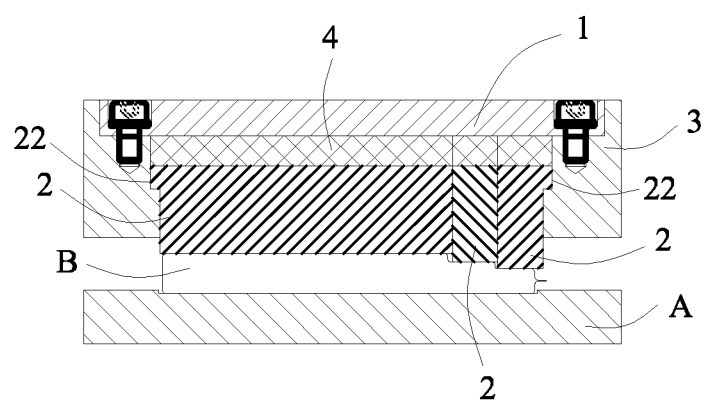
FIG. 4 is another variant of FIG. 2.
Figure 5:
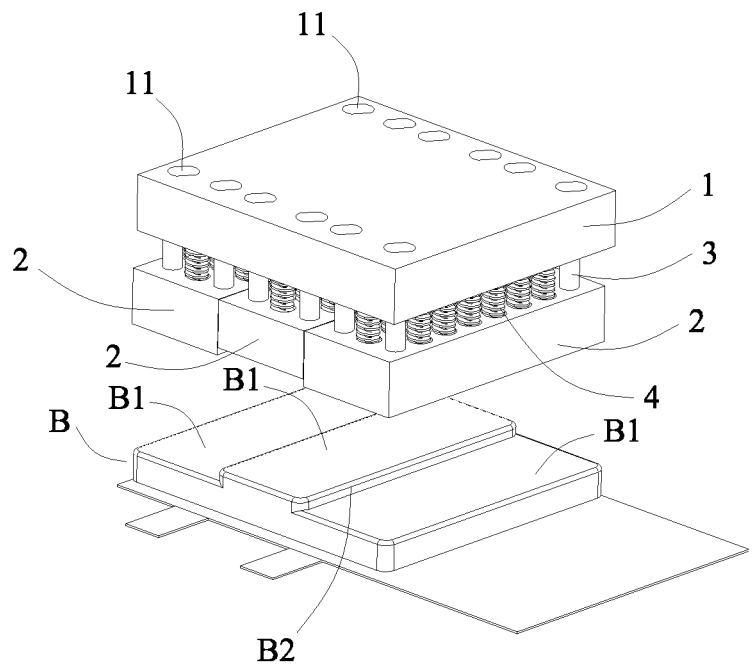
FIG. 5 is an exploded perspective view of another embodiment of the pressing device according to the present disclosure with a bottom plate not shown.

In an embodiment, the positioning member 3 may be a fixed seat which is securely connected to the cover plate 1 and slides up and down together with the cover plate 1 relative to each floating head 2. Furthermore, referring to FIG. 1 to FIG. 4, the positioning member 3 may have: a receiving recess 31 receiving all the floating heads 2. Referring to FIG. 1, FIG. 2 and FIG. 4, each floating head 2 may have a flange 22 cooperating with the receiving recess 31 to limit a moving downward distance of each floating head 2. Here it is noted that, provision of the flange 22 and the receiving recess 31 are intended to allow the corresponding elastic member 4 to have a certain amount of compression in advance while assembling the pressing device, thereby saving a relative moving distance of the cover plate 1 and each floating head 2.

In an embodiment, referring to FIG. 1, FIG. 2 and FIG. 4, the positioning member 3 may further have a boss 32 extending upwardly from an upper surface of the receiving recess 3, an upper surface of the boss 32 directly contacts the lower surface of the cover plate 1 so as to support the cover plate 1.

In an embodiment, referring to FIG. 1 to FIG. 4, the receiving recess 31 may be provided with grooves 311. Each floating head 2 may be provided with a protruding post 23 cooperating with the corresponding groove 311 of the receiving recess 31. Based on cooperation of the groove 311 and the protruding post 23, the cover plate 1 can slide up and down relative to each floating head 2.

In an embodiment, the receiving recess 31 may be provided with protruding posts (not shown). Each floating head 2 may be provided with a groove (not shown) cooperating with the corresponding protruding post of the receiving recess 31.

In an embodiment, the positioning member 3 may be provided as guide posts, each guide post is slidably connected to the cover plate 1 and is securely connected to the corresponding floating head 2. Furthermore, referring to FIG. 5 and FIG. 6, the cover plate 1 may be provided with counterbores 11. Each guide post may be provided with a head portion 33 which cooperates with the corresponding counterbore 11 to limit a distance of movement up and down of the corresponding floating head 2 and a tail portion 34 which is securely connected to the corresponding floating head 2.

In an embodiment, the pressing device may be used to press the workpiece B with step surfaces B1. Herein, when the pressing device presses the workpiece B, the lower surface of each floating head 2 directly contacts the corresponding step surface B1 of the workpiece B to allow each floating head 2 to press down the corresponding step surface B1 of the workpiece B. Here it is noted that, when the positioning member 3 is a fixed seat, the pressing device is suitable for the workpiece B with a small size, when the positioning member 3 is provided as guide posts, the pressing device is suitable for the workpiece B with a large size.

In an embodiment, the workpiece B may be placed on a bottom plate A. But the present disclosure is not limited to this, the workpiece B may be also placed on any suitable workbench, as long as it ensures that the workpiece B is placed stably.

In an embodiment, referring to FIG. 7 to FIG. 10, the workpiece B may be a step type cell or a step type battery.

In an embodiment, the pressing device further comprises a heating member (not shown) provided around the workpiece B so as to heat the workpiece B by radiation.

In an embodiment, the heating member may be a heating tube provided to each floating head 2.

What is claimed is:

1. A pressing device, comprising:
   a plurality of floating heads which are arranged side by side for pressing a workpiece;
   a positioning member connecting with each of the floating heads and defining a position of each of the floating heads;
   a cover plate positioned above each of the floating heads; and
   elastic members, each elastic member being provided between the cover plate and the corresponding floating head so as to make the cover plate slide up and down relative to each of the floating heads;
   wherein the positioning member is a fixed seat which is securely connected to the cover plate and slides up and down together with the cover plate relative to each of the floating heads;
   the positioning member has a receiving recess receiving all the floating heads;
   each of the floating heads has a flange cooperating with the receiving recess to limit a moving downward distance of each of the floating heads.

2. The pressing device according to claim 1, wherein each elastic member is a spring.

3. The pressing device according to claim 2, wherein
   the cover plate is provided with receiving holes, one end of each spring is received in the corresponding receiving hole and the other end of each spring abuts an upper surface of the corresponding floating head; or
   each floating head is provided with a mounting hole, one end of each spring is received in the corresponding mounting hole and the other end of each spring abuts a lower surface of the cover plate.

4. The pressing device according to claim 1, wherein the positioning member further has a boss extending upwardly from an upper surface of the receiving recess, an upper surface of the boss directly contacts a lower surface of the cover plate so as to support the cover plate.

5. The pressing device according to claim 1, wherein
   the receiving recess is provided with grooves, each floating head is provided with a protruding post cooperating with the corresponding groove of the receiving recess; or
   the receiving recess is provided with protruding posts, each floating head is provided with a groove cooperating with the corresponding protruding post of the receiving recess.

6. The pressing device according to claim 1, wherein height positions of lower surfaces of at least two floating heads of the plurality of floating heads are different.

* * * * *